Patented Oct. 13, 1942

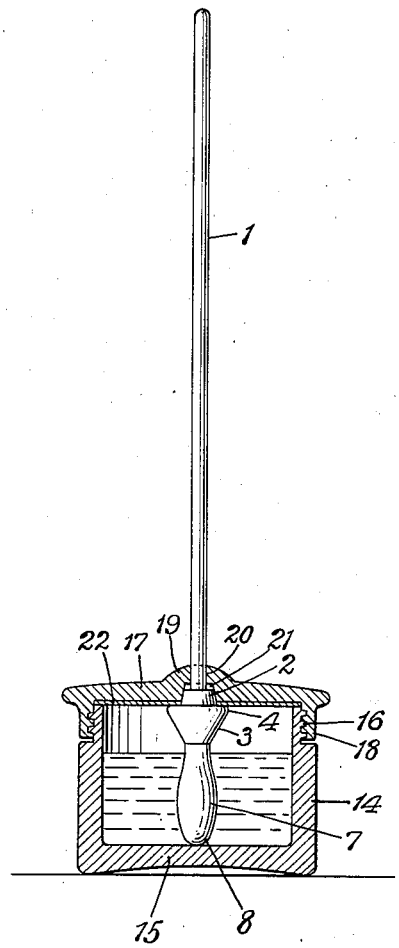
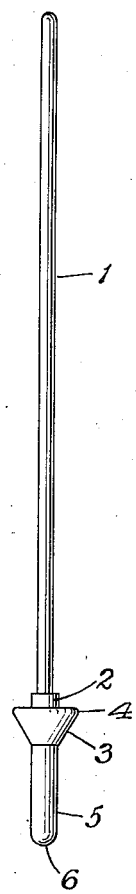
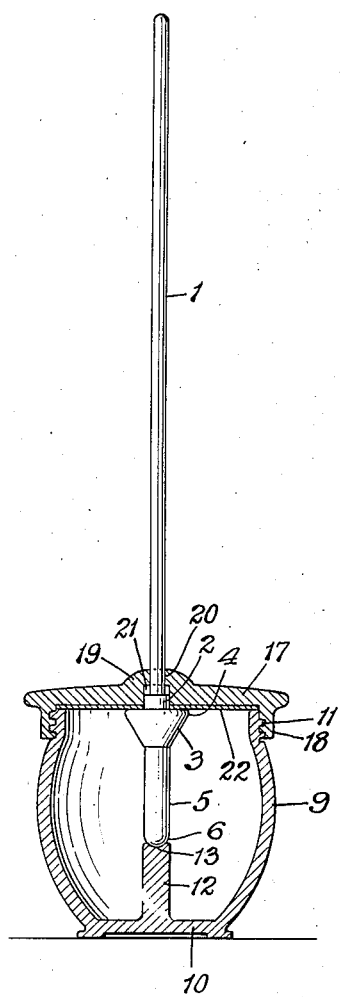

2,298,534

UNITED STATES PATENT OFFICE 2,298,534

APPLICATOR AND CONTAINER

Earl C. Kaye, Evanston, Ill.

Application February 23, 1940, Serial No. 320,411

17 Claims. (Cl. 15—140.3)

This invention relates to a jar or container, a cover therefor and an applicator for use in applying the contents of the jar. It has for one object to provide the combination of a jar, a cover and an applicator so arranged that the applicator, when the cover is in place, helps to exert compression on the cover to effect an adequate seal. Another object is to provide a jar, a cover and an applicator so proportioned that the applicator is in fixed contact with a portion of the jar when the cover is closed. Another object is to provide a readily removable applicator arranged for use and provided with limiting and guiding means.

Other objects will appear from time to time throughout the specification and the claims.

The invention is illustrated more or less diagrammatically in the accompanying drawing, wherein:

Figure 1 is a section through the jar and cover with one form of applicator shown in elevation;

Figure 2 is an elevational view of the applicator removed from the jar;

Figure 3 is a view similar to Figure 1, showing a modified form of jar and a somewhat modified form of applicator.

Like parts are designated by like characters throughout the specification and the drawing.

1 is an applicator handle upon which is mounted an applicator 2 which may be integral with the handle 1 or may be separately made and attached to it. As shown in Figures 1 and 2, the applicator has an enlarged, inclined portion 3 which preferably terminates at its outer edge in a rounded portion 4. The applicator is reduced as at 5 and preferably terminates at its end in a rounded portion 6.

The modified form of applicator shown in Figure 3 is the same as that shown in Figures 1 and 2 except that, instead of the relatively straight-sided section 5, it is provided with an enlarged or expanded applicator section 7 which is preferably rounded at its end as at 8.

One form of the container or jar with which the applicator may be used is shown in Figure 1 and, as there shown, comprises a bowl-like member 9, having a base member 10. The jar is exteriorly threaded as at 11 to receive a cover and may have an internal projection 12 which is formed in its upper end with a depression 13 of such size and shape as readily to receive the end of the applicator.

In the modified form of container shown in Figure 3, there is a jar or bowl 14 provided with sides and a bottom 15. This bowl is threaded, as at 16, exteriorly. Either of the bowls might be threaded interiorly, if desired. The invention is not limited to any particular size or shape of bowl or jar.

A cover of any desired shape and pattern may be used. As shown, the same cover is applied in Figures 1 and 3. It comprises an extended cover portion 17 having a downwardly depending, interiorly threaded flange 18. Adjacent its center, the cover is provided with the raised or thickened portion 19 which is perforated as at 20 to permit insertion of the handle 1. A depression 21 is preferably formed on the inner face of the cover and is of such size that the portion 2 of the applicator fits tightly within it. A gasket or liner member 22 may be used; and, if used, is placed on the inner face of the cover. The gasket may be of any desired size and shape. It may cover the entire inner surface of the cover, as shown; or it may be so small as merely to cover the upper face of the enlarged portion 3, 4 of the applicator; or, if desired, it may be entirely omitted.

Although there is shown an operative form of the device, it will be understood that many changes in the form, shape and arrangement of parts might be made without departing from the spirit of this invention, and it is wished that the showing be taken as, in a sense, diagrammatic.

In particular, many changes are contemplated in the shape of the jar or container and in the shape of the actual applicator portion and in the shape of the handle. An applicator of a different size and shape might be used, and it may be of any cross section. A bowl or container of almost any shape or size might be used. The cover might be shaped to fit inside the bowl instead of outside, and the depression 21 in the cover may be tapered to effect a total or partial sealing with the handle 1 or the portion 2 of the applicator. The taper would normally be very slight, if present at all. The applicator need not fit into the depression in the cover. Any style of gasket, liner or sealing means might be used, or such means might be entirely omitted. While the applicator has been shown as contacting the bottom of the container or a portion raised from the bottom, the bowl might be so shaped that the applicator would contact some other part, and the invention is not limited to a construction in which the applicator contacts the bottom of the bowl or a projection raised from the bottom. The applicator itself might be permanently fixed to the cover or might be formed as a part of the cover unitarily with it.

The use and operation of this invention are as follows:

In general, the applicator may be used to apply material such as cold cream, medicated jellies and the like to the body externally or internally.

If it be assumed that the container is filled with cold cream, the applicator will be in the position shown in Figures 1 and 3 when the cover is closed. In that position, sufficient compression is exerted upon the cover by the rigidity of the applicator to cause an effective sealing action at the edges of the cover and centrally.

When the applicator is to be used, the cover is unscrewed, the handle of the applicator is withdrawn from the cover and the applicator is then available for use without the interference of the cover. Of course, for some purposes the cover might be left on the handle during use. Ordinarily, it is not convenient to do so.

With the cover removed from the handle and the applicator covered by or carrying a sufficient quantity of the material which is to be applied, it is used in any way. If the material be cold cream, it may be readily applied to the face—not as would be done by smearing it on by hand but by definitely applying it to the particular place desired; for example, about the eyes or some other specified location.

Another frequent use is in the application of medicated jellies, greases or the like. Where that is the purpose, the container will be filled with some medicated material. When this is to be applied, the cover is unscrewed, the cover is then preferably removed from the handle and the medicated material is applied as desired. This material may be suitable for application to the nose. In that case, the applicator will be put into the nose and the material applied as desired. The portion 3, 4 serves partially as a stop to limit the inward movement of the applicator into the nose. It is not of such size as to make further entrance impossible but it prevents actual insertion through too great a distance. Preferably, the member 3 is rounded as at 4 to avoid the danger of injury, and, of course, this facilitates withdrawal as well as insertion.

The applicator may, of course, be repeatedly inserted in the container to get a new supply of material which is to be applied and after it has been finally used, it is cleaned—preferably by being wiped off—and is then reinserted in the lid or cover, provided it has been removed therefrom, and the parts are restored to the positions shown in Figures 1 and 3 in which the cover is engaged upon the container and in which the applicator contacts some form of stop so that, as the cover is moved to fully closed position, the applicator is stopped from further movement into the container and compression is set up which improves the degree of sealing, both about the handle or at the point where the applicator contacts the cover and also throughout the area at which the cover is engaged upon the container.

The applicator will ordinarily be made of some smooth hard material. The invention is not, however, limited to any particular applicator. It should have sufficient rigidity to permit the sealing action mentioned but its total surface need not be hard. It might have a soft exterior at certain points or a soft covering or coating, provided it has sufficient rigidity to accomplish the sealing described.

I claim:

1. In combination, a container, a removable cover therefor, an applicator, an applicator handle, a perforation in said cover, said handle shaped and dimensioned to pass through said perforation, and means including said applicator for exerting compression from within upon said cover when the cover is in closing position upon said container, to insure a tight fit of said cover and container.

2. In combination, a container, a removable cover therefor, a rigid applicator, an applicator handle, a perforation in said cover, said handle shaped and dimensioned to pass through said perforation, and means, including said applicator and a part of said container, for exerting compression upon said cover when the cover is in closing position upon said container.

3. In combination, a container, a removable cover therefor having a perforation formed therein, a rigid applicator having a handle portion shaped and adapted to extend through said perforation, a stop portion formed in said container, means to limit the movement of said handle through said perforation, said applicator adapted, when the cover is in closed position upon the container, to contact said stop portion and thereby to exert compression upon said cover.

4. In combination, a container, a removable cover therefor having a perforation formed therein, a rigid applicator having a handle portion shaped and adapted to extend through said perforation, a portion of the applicator, being shaped and adapted to extend into the perforation, said container having a stop portion, means to limit the movement of said handle through said perforation, said applicator adapted, when the cover is in closed position upon the container, to contact said stop portion and thereby to exert compression upon said cover.

5. In combination, a container, a removable cover therefor having a perforation formed therein, a rigid applicator having a handle portion shaped adapted to extend through said perforation, a portion of the applicator being shaped and adapted to extend into the perforation and having also a shoulder adapted to contact the inner face of the cover, said container having a stop portion, said applicator adapted, when the cover is in closed position upon the container, to contact said stop portion and thereby to exert compression upon said cover.

6. In combination, a container, a removable cover therefor having a tapered perforation formed therein, a rigid applicator having a handle portion adapted to extend through said perforation, a portion of the applicator being shaped and adapted to extend into the tapered perforation and having also a shoulder adapted to contact the inner face of the cover, a stop portion formed in said container, said applicator adapted, when the cover is in closed position upon the container, to contact said stop portion and thereby to exert compression upon said cover.

7. In combination, a container, a removable cover therefor having a perforation formed therein, a rigid applicator having a handle portion shaped and adapted to extend through said perforation, and having also a shoulder adapted to contact the inner face of the cover, a stop portion formed in said container, said applicator adapted, when the cover is in closed position upon the container, to contact said stop portion and thereby to exert compression upon said cover.

8. In combination, a container, a removable cover therefor, an applicator, a rigid applicator handle, a perforation in said cover, said handle adapted to pass through said perforation, a stop portion on said handle limiting movement of said handle through said perforation and means for exerting compression upon said cover when the cover is in closing position upon said container, said means including a raised stop member formed integrally with and within said container, in a position to be contacted by said applicator when the latter is within the container.

9. In combination, a container, a removable cover therefor, an applicator, an applicator handle, a perforation in said cover, said handle shaped and dimensioned to pass removably through said perforation, means limiting the movement of said handle through said perforation, and means, including said applicator and a part of said container, for exerting compression upon said cover when the cover is in closing position upon said container, said means including a raised stop member formed within said container.

10. In combination, a container, a removable cover therefor having a perforation formed therein, a rigid applicator having a handle portion shaped and dimensioned to extend through said perforation, a stop portion formed in said container, means limiting the movement of said handle through said perforation, said applicator adapted, when the cover is in closed position upon the container, to contact said stop portion and thereby to exert compression upon said cover, said stop portion comprising a stop member formed integrally with and extending inwardly above the bottom of said container.

11. In combination, a container, a removable cover therefor having a perforation formed therein, a rigid applicator having a handle portion shaped adapted to extend through said perforation, a portion of the applicator being shaped and adapted to extend into the perforation, a stop portion formed in said container, means to limit the movement of said applicator through said perforation, said applicator adapted, when the cover is in closed position upon the container, to contact said stop portion and thereby to exert compression upon said cover, said stop portion comprising a stop member formed integrally with and extending inwardly above the bottom of said container.

12. In combination, a container, a removable cover therefor having a perforation formed therein, a rigid applicator having a handle portion shaped and adapted to extend removably through said perforation, a portion of the applicator being shaped and adapted to extend into the perforation and having also a shoulder adapted to contact the inner face of the cover, a stop portion formed in said container, said applicator adapted, when the cover is in closed position upon the container, to contact said stop portion and thereby to exert compression upon said cover, said stop portion comprising a stop member formed integrally with and extending inwardly above the bottom of said container.

13. In combination, a container, a removable cover therefor having a tapered perforation formed therein, an applicator having a handle portion shaped and dimensioned to extend through said perforation, a portion of the applicator being shaped and adapted to extend into the tapered perforation and having also a shoulder adapted to contact the inner face of the cover, a stop portion formed in said container, said applicator adapted, when the cover is in closed position upon the container, to contact said stop portion and thereby to exert compression upon said cover, said stop portion comprising a stop member formed integrally with and extending inwardly above the bottom of said container.

14. In combination, a container, a removable cover therefor having a perforation formed therein, a load carrying applicator having a handle portion shaped and dimensioned to extend removably through said perforation, and having also a shoulder adapted to contact the inner face of the cover, a stop portion formed in said container, said applicator adapted, when the cover is in closed position upon the container, to contact said stop portion and thereby to exert compression upon said cover, said stop portion comprising a stop member formed integrally with and extending inwardly above the bottom of said container.

15. In combination, a container, a cover screw-threaded thereon, a tapered perforation in said cover adapted to provide a socket portion, a stop portion formed in said container, a substantially rigid applicator, a handle for said applicator, said handle adapted to pass through said perforation, a portion of said applicator adapted to fit within said socket, sealing means associated with said cover, said applicator being slightly longer than the distance between the inner face of said cover and the stop portion whereby, when the parts are in the closed position, compression is set up between the cover, the container and the applicator to effect adequate sealing of the parts together.

16. In combination, a rigid container, a removable cover therefor, a rigid applicator, said applicator being positioned within said container and in fixed contact with said cover, and means including said rigid applicator and a part of said container for exerting compression from within said container upon said cover at a point away from its edge when the cover is in closing position upon said container.

17. In combination, a rigid container, a removable perforated cover therefor cooperating parts on said container and on said cover removably holding the two together, a rigid applicator, said rigid applicator being positioned within said container and in fixed contact with said cover, when the latter is in closed position, and with a fixed part of said container, and means, including said applicator and the part of said container contacted thereby, for exerting compression upon said cover when the cover is in closing position upon said container.

EARL C. KAYE.